(12) United States Patent
Newbury et al.

(10) Patent No.: US 12,164,154 B2
(45) Date of Patent: Dec. 10, 2024

(54) OPTICAL CONNECTORS FOR A MULTIPORT ASSEMBLY

(71) Applicant: Senko Advanced Components, Inc., Hudson, MA (US)

(72) Inventors: Paul Newbury, Ashland, MA (US); Ronald J Kleckowski, Manchester Center, VT (US)

(73) Assignee: Senko Advanced Components, Inc., Hudson, MA (US)

( * ) Notice: Subject to any disclaimer, the term of this patent is extended or adjusted under 35 U.S.C. 154(b) by 274 days.

(21) Appl. No.: 17/748,218

(22) Filed: May 19, 2022

(65) Prior Publication Data

US 2022/0373744 A1 Nov. 24, 2022

Related U.S. Application Data

(60) Provisional application No. 63/315,011, filed on Feb. 28, 2022, provisional application No. 63/276,571, filed on Nov. 6, 2021, provisional application No. 63/191,053, filed on May 20, 2021.

(51) Int. Cl.
   *G02B 6/38* (2006.01)
(52) U.S. Cl.
   CPC .................. *G02B 6/3831* (2013.01)

(58) Field of Classification Search
   CPC ............................. G02B 6/38; G02B 6/3831
   See application file for complete search history.

(56) References Cited

U.S. PATENT DOCUMENTS

| | | | |
|---|---|---|---|
| 6,767,141 B1 | 7/2004 | Dudek et al. | |
| 6,776,533 B2 | 8/2004 | Gherardini | |
| 2015/0253527 A1 | 9/2015 | Hill et al. | |
| 2017/0299817 A1 | 10/2017 | Huang et al. | |
| 2019/0170961 A1* | 6/2019 | Coenegracht | G02B 6/44775 |
| 2020/0310048 A1 | 10/2020 | Chang et al. | |

FOREIGN PATENT DOCUMENTS

WO 2021/252674 A1 12/2021

OTHER PUBLICATIONS

PCT International Searching Authority, International Search Report and Written Opinion, dated Aug. 19, 2022, International Application No. PCT/US22/30107, 9 pages.

* cited by examiner

*Primary Examiner* — Tina M Wong

(57) ABSTRACT

Connectors for a multiport assembly are disclosed. The multiport assembly can include a multiport device that communicatively couples multiple sets or pairs of connectors, such as optical connectors, together. The connectors include securing features to inhibit unintentional withdrawal of the connectors from the multiport device.

19 Claims, 10 Drawing Sheets

OPTICAL CONNECTORS FOR A MULTIPORT ASSEMBLY

CROSS-REFERENCE TO RELATED APPLICATIONS

This application claims priority to U.S. Provisional App. No. 63/315,011, filed Feb. 28, 2022, and to U.S. Provisional App. No. 63/276,571, filed Nov. 6, 2021, and to U.S. Provisional App. No. 63/191,053, filed May 20, 2021, the entireties of which are hereby incorporated by reference.

FIELD

The present disclosure generally relates to connections for optical and/or electrical transmission and distribution, and, more specifically, to optical connectors for a multiport assembly.

BACKGROUND

Connectors are used within electromagnetic transmission networks to interconnect optical and/or electrical cables to optical and/or electrical devices or other optical or electrical cables. Electromagnetic connections of this type typically involve two connectors coupled together either directly or with the assistance of an adapter. Quality fiber optic connections have become desirable in an environment of high numbers of electronic communications. An expanded use of fiber optic communication includes an increase in outdoor connections that must be made. However, fiber optic communication can fail in environments of high moisture and fine debris.

SUMMARY

In one aspect, an outdoor rated fiber optic connector for being plugged into a port of a multi-port device is disclosed. The port defines a connector socket sized and shaped to receive the connector. The connector comprises a housing having a longitudinal axis and an exterior surface. A first seal is on the housing and is positioned for engaging the multiport device in the port upon reception of the connector in the port. A ferrule assembly is supported by the housing and defines a connection end of the connector. A deflectable latch is supported by the housing and is arranged to be disposed in the connector socket when the connector is disposed in the port. The deflectable latch is configured for latching engagement with the port device to releasably retain the connector in the port.

Other objects and features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION

The present disclosure related to connectors for a multiport assembly for forming communication or transmission connections (e.g., optical connections, electrical connections) between communication cables C, such as fiber optic cables and electrical cables. Generally, communication cables have connectors (e.g., optical connectors, electrical connectors) at an end thereof that are constructed to form a communication connection with another communication device, such as another connector. When coupled to the communication device (e.g., another connector), the connector and the communication device form a communication connection that enables communication between different communication components (e.g., cables, devices, etc.) in a communications network (e.g., an optical communications network, an electrical communication network). Typically, the connector is attached to an end of a communication cable, although other arrangements are within the scope of the present disclosure. Other configurations of the multiport assembly, and associated components, are within the scope of the present disclosure. For example, the multiport assembly and associated component can be used to make other types of connections. Moreover, the connections made with the multiport assembly are repeatable, with a high degree of insolation of the fiber optic connection from moisture, debris, etc. from the outdoor environment in which the multiport assembly can be used.

Figure 1:
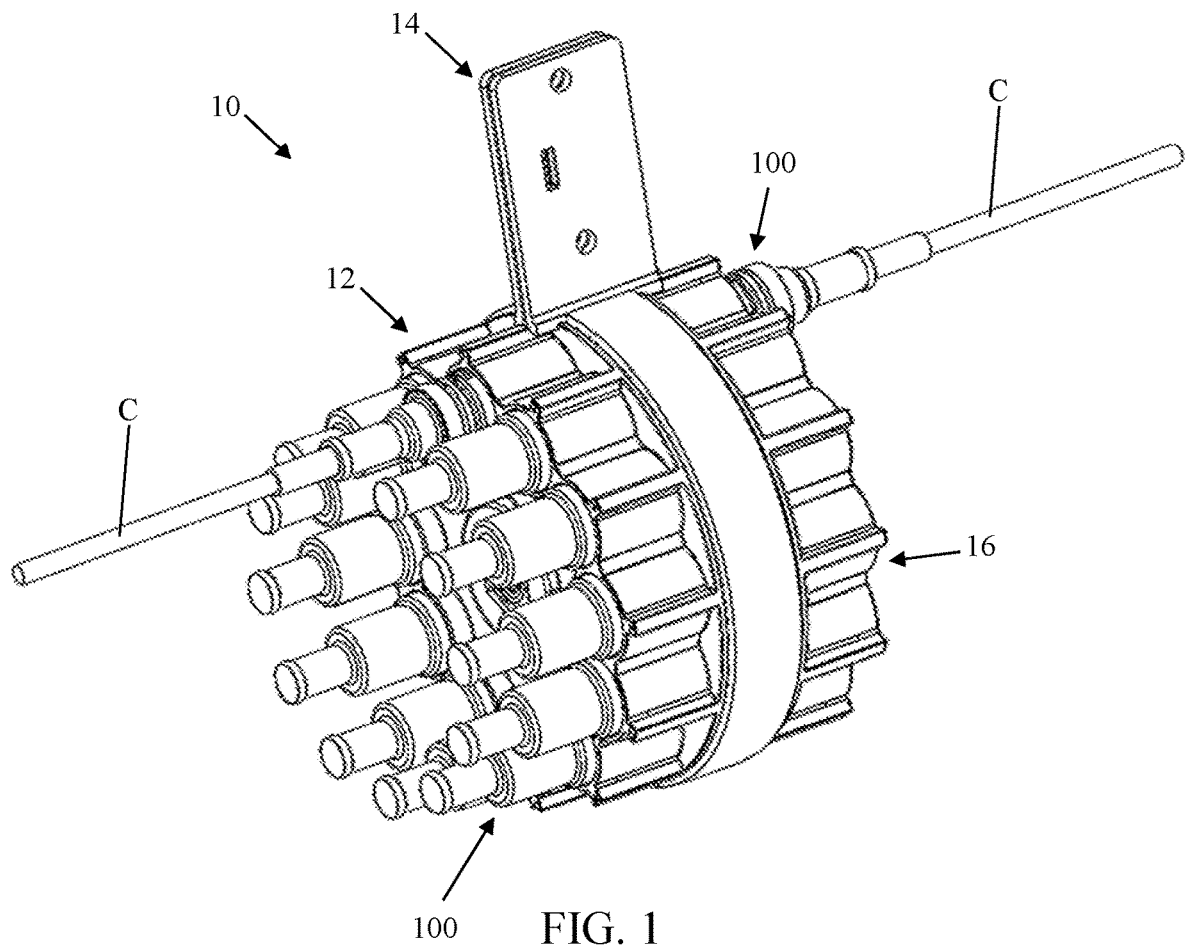
FIG. 1 is a perspective of a multiport assembly according to one embodiment of the present disclosure.
Figure 2:
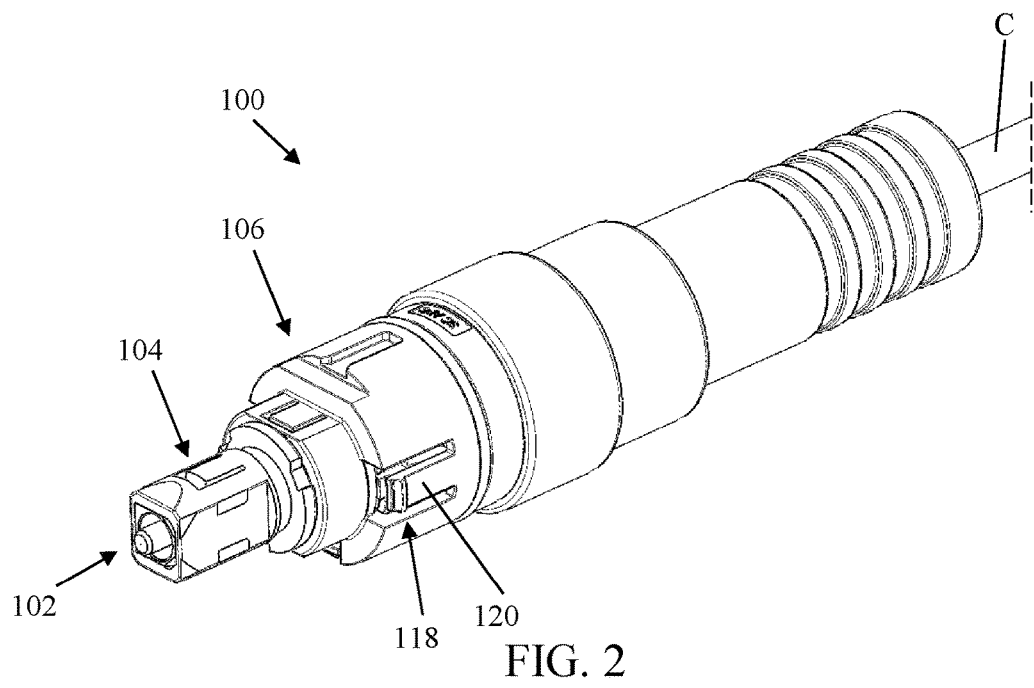
FIG. 2 is an enlarged perspective of a connector according to one embodiment of the present disclosure, the connector being part of the multiport assembly of FIG. 1.
Figure 3:
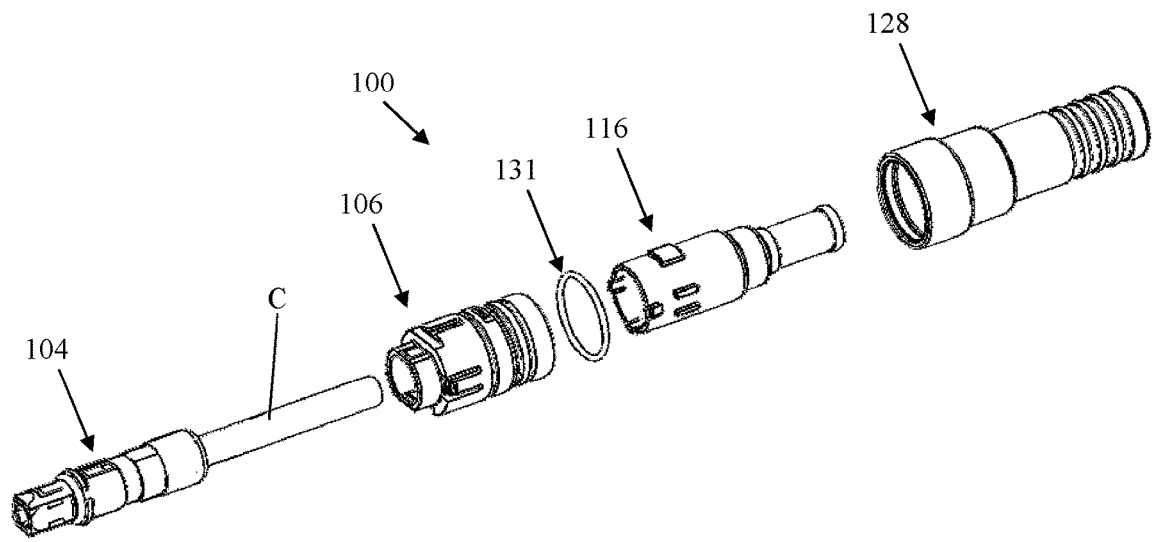
FIG. 3 is an exploded view of the connector.

Referring to FIG. 1, a multiport assembly according to one embodiment of the present disclosure is generally indicated at reference numeral 10. The multiport assembly 10 is used to form communication connections between a plurality of communication devices. The multiport assembly 10 includes a multiport device (broadly, a port device), generally indicated at 12, a plurality of connectors, generally indicated at 100, and a mounting bracket 14 for mounting the multiport assembly to a supporting structure, such as beam, post, etc.

Figure 9:
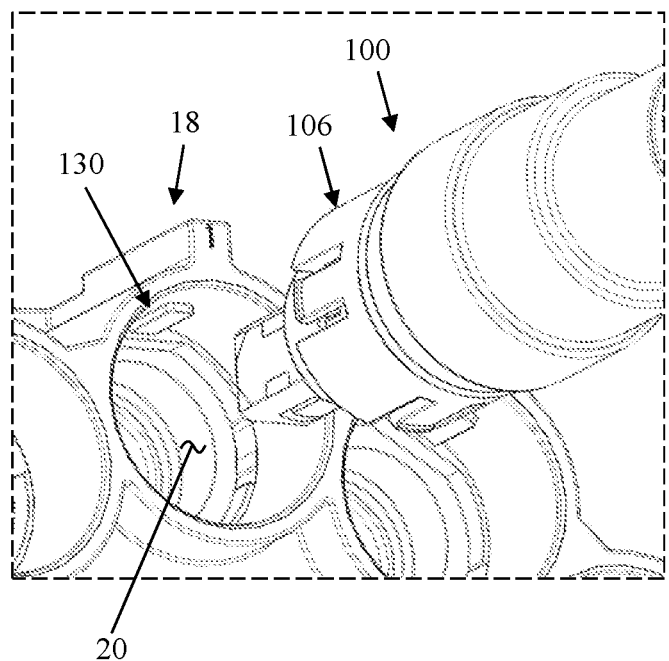
FIG. 9 is a fragmentary, upwardly directed perspective of the multiport assembly with a connector exploded therefrom.
Figure 10:
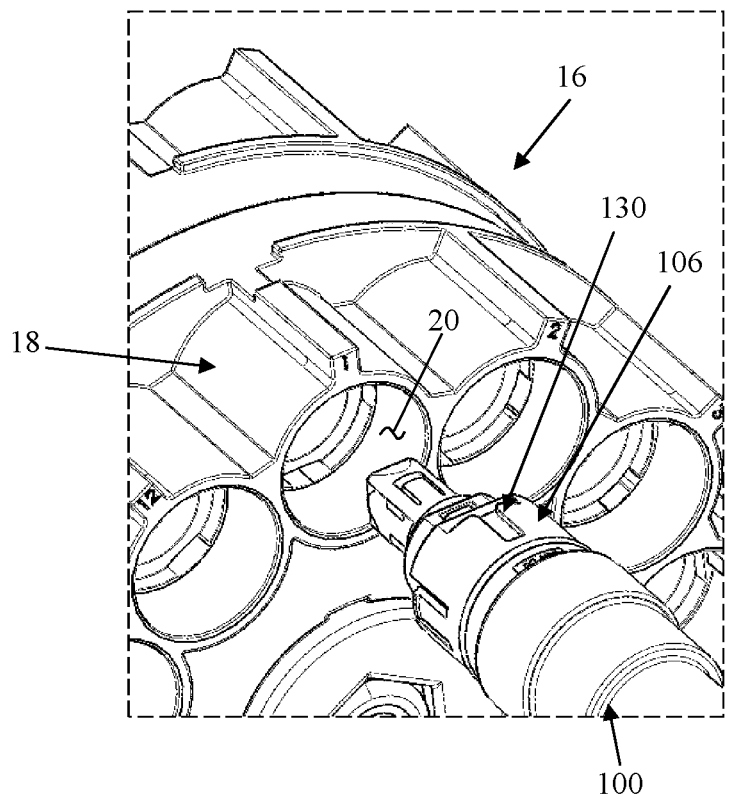
FIG. 10 is a downwardly looking perspective of the multiport assembly with a connector exploded therefrom.
Figure 11:
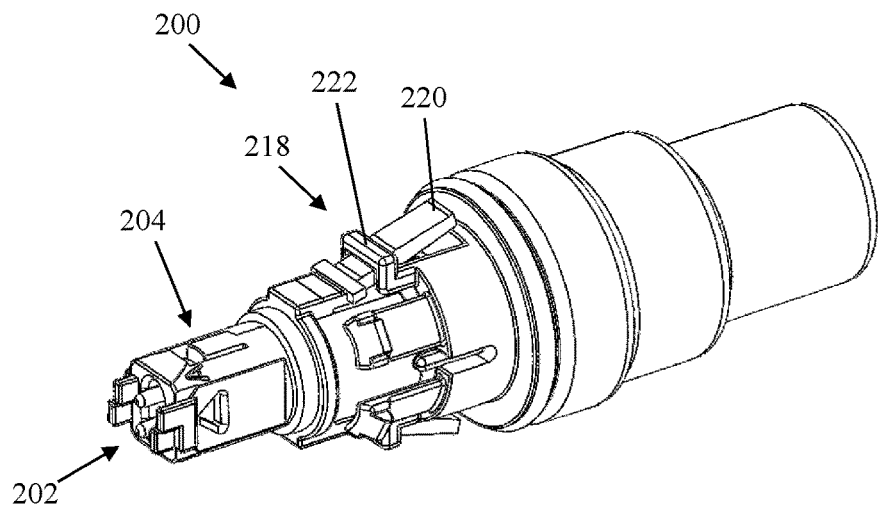
FIG. 11 is a perspective of a connector according to another embodiment of the present disclosure.
Figure 12:
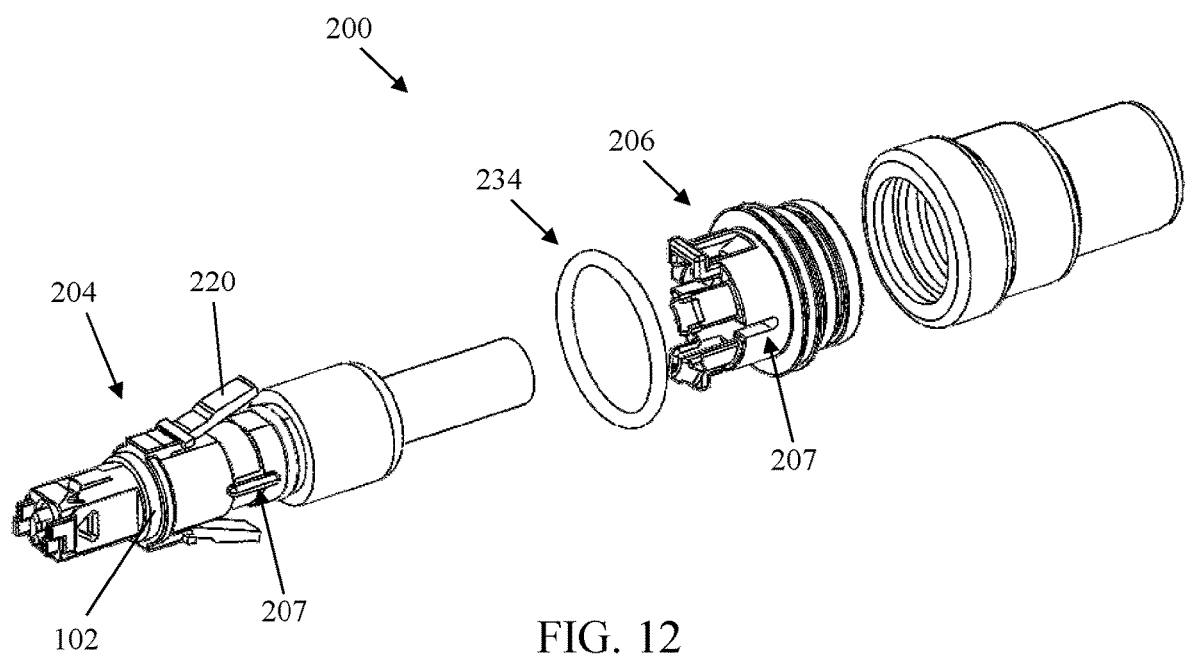
FIG. 12 is an exploded view of the connector of FIG. 11.

The multiport device 12 connects connectors 100 together. Specifically, the multiport device 12 communicatively couples sets or pairs of connectors 100 together for transferring signals (e.g., optical signals, electrical signals, etc.) therebetween. The multiport device 12 includes a port body 16. The port body 16 includes a plurality of ports 18 on either end of the port body (FIGS. 9 and 10). Each port 18 is configured to receive and couple to a connector 100. Each port 18 has (e.g., defines) an opening (e.g., port opening or outer opening) generally at the outer end of the port body and a connector socket 20 extending (generally longitudinally) toward the other end portion of the port body 16. The opening and the connector socket 20 are sized and shaped to receive the connector 100 (broadly, at least a portion of the connector). In the illustrated embodiment, the opening and the connector socket 20 are generally circular. The circular configuration is helpful in making weather-tight seals with the multiport device 12 in the sockets 20. The connector 100 is connected to the port 18 by inserting or plugging the connector into the connector socket 20 in the insertion direction. When the connector 100 mates with one of the ports 18, the connector also mates with a communication device, such as another connector (when the communication device is plugged into a corresponding port on the other end of the port body). As described in more detail below, each port 18 include one or more latch retainers (broadly, engagement surfaces) for securing the connector 100 in the port. The latch retainers generally define or border the connector socket 18 (broadly, the latch retainers are disposed in the connector socket). Further details of the multiport assembly, and specifically the multiport device, may be found in PCT Publication No. WO2021/252674, the entirety of which is hereby incorporated by reference.

Referring to FIGS. 2-10, one embodiment of a connector is generally indicated at reference numeral 100. The connector 100 plugs into one of the ports 18 of the multiport device 12. The connector 100 includes a ferrule assembly 102 (containing one or more ferrules). The ferrule assembly 102 defines a connection end of the connector 100. The ferrule assembly 102 is received first into one of the ports 18 of the multiport device 12 to plug or connect the connector to the port. In this embodiment, the ferrule assembly 102 comprises a simplex fiber optic connection, and more particularly a simplex SC ferrule assembly. Thus, in this embodiment, the connector 100 may be referred to as a SC connector (e.g., SC optical connector). In this embodiment, the connector 100 is attached to an end of a fiber optic cable C. In other embodiments, the ferrule assembly may comprise other types of ferrules assemblies, such as an MPO ferrule assembly or an SN ferrule assembly. Any ferrule configuration is within the scope of the present disclosure.

The connector 100 includes a housing 104 (e.g., a ferrule housing) that supports the ferrule assembly 102. The housing 104 extends from a front or distal end portion to a rear or proximal end portion. The cable C extends rearward or proximally from the rear end portion and the ferrule assembly 102 extend forward or distally from the front end portion of the housing 104. The housing includes a flange 105 that braces a first seal 232 (e.g., an O-ring) that engages the port 18 to form a fluid-tight seal with the multiport device to prevent the ingress of moisture and debris.

Figure 6:
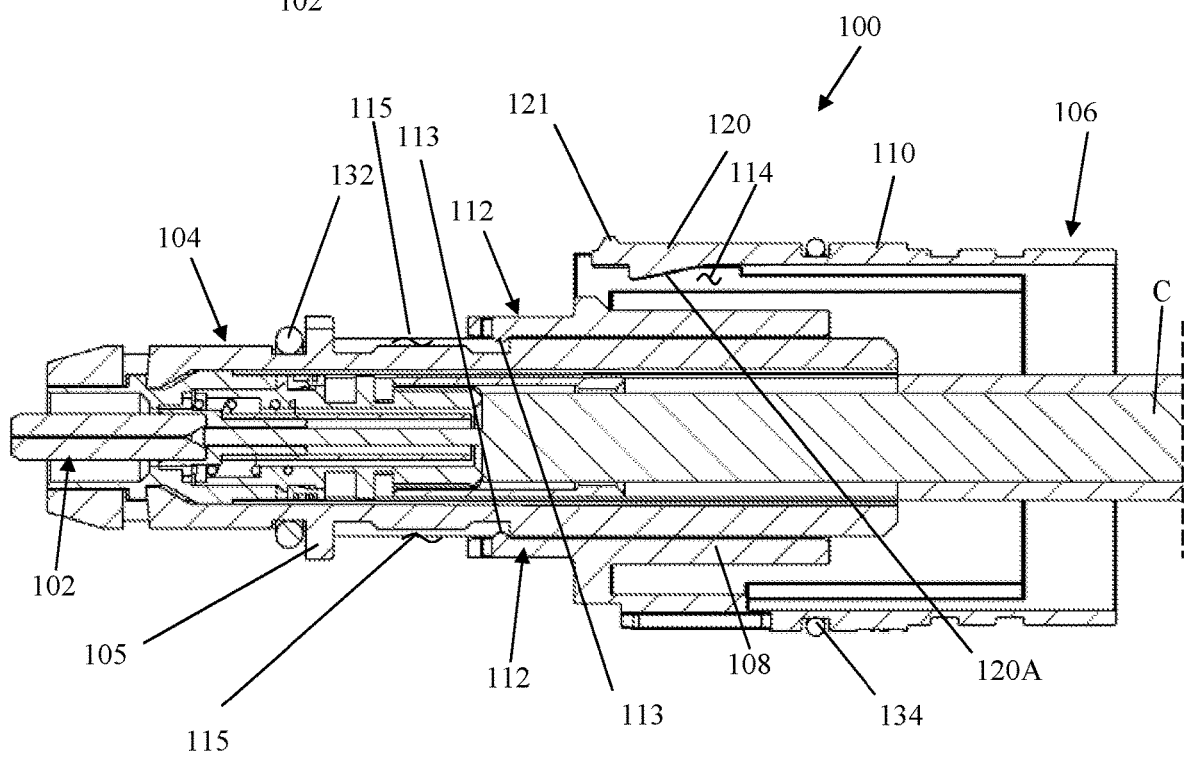
FIG. 6 is a vertical section of the connector with the securing collar and a shroud removed to reveal interior details.

The connector 100 includes a latch collar or housing 106 supported by the housing 104. The latch housing 106 is movable relative to the housing 104. Specifically, the latch housing 106 is longitudinally slidable along the housing 104 in a direction that is generally parallel to a longitudinal axis of the connector 100. Referring to FIG. 6, the latch housing 106 includes an inner collar 108 and an outer collar 110 coupled together. The inner collar 108 defines a housing space or bore sized and shaped to receive the housing 104. The housing 104 and the inner collar 108 include corresponding flats (broadly, rotational alignment keys) to prevent the housing and latch housing from rotating relative to one another. The latch housing 106 includes at least one housing stop 112 arranged to engage the housing 104 to limit the movement of the latch housing relative to the housing. In the illustrated embodiment, the latch housing 106 includes two housing stops 112, on opposite sides of the connector 100. Each housing stop 112 comprises a deflectable (e.g., resiliently deflectable) latch connected to the inner collar 108. Each housing stop 112 includes a detent or catch 113 arranged to engage the housing 104. In some embodiments, including the illustrated embodiment, the port 18 includes a narrower portion that receives the housing 104 and a wider portion that receives the latch housing 106.

The housing 104 defines a corresponding longitudinal recess or channel 115 for each housing stop 112 that receives the detent thereof. The recess permits the housing stop to move therein. The detent of each housing stop 102 is disposed in its corresponding recess. The housing stop 112 secures to latch housing 106 to the housing 104. Specifically, the housing stops 112 set the rearward most position the latch housing 106 can move relative to the housing 104 (e.g., prevents the latch housing from sliding off the rear end of the housing). In operation, the housing stops 112 deflect as the housing 104 is inserted into the bore of the inner collar 108 to permit the latch housing 106 to be mounted on the housing. When the connector 100 is inserted into the port 18, the latch housing 106 is free to move forward relative to the housing 104 until the inner collar 108 contacts the flange of the housing (at which point the housing and latch housing move forward together). When the connector 100 is withdrawn from the port 18, the latch housing 106 is free to move rearward relative to the housing 104 until the housing stop 112 contacts the portion of the housing defining the rear end of the recess (at which point the housing and latch housing move rearward together). Thus, the housing stops 112 help withdraw the ferrule assembly 102 from the port 18. The recess in the housing 104 permits a degree of movement between the housing and latch housing 106 to provide a degree of tolerance between the components of the multiport assembly 10, such as for the mating of the connectors 100.

Referring to FIG. 6, the inner and outer collars 108, 110 are spaced apart from one another. The inner and outer collars 108, 110 define a generally circumferential space 114 (e.g., recess or channel) therebetween. The space 114 has an open rear or proximal end. The connector 100 includes a securing collar or housing 116 (e.g., a locking collar). A front end portion of the securing collar 116 is disposed in the circumferential space 114 and a rear end portion of the securing collar is disposed proximal of the housing 104 and latch housing 106. The securing collar 116 defines a longitudinal bore therethrough in which a portion of the housing 104, the latch housing 106 and the cable C are disposed. Specifically, the securing collar 116 surrounds a portion of the inner collar 108, the rear end portion of the housing and a portion of the cable C. The securing collar 116 is supported by the housing 104. The securing collar 116 is also movable relative to the housing 104. The securing collar 116 is also movable relative to the latch housing 106. Specifically, the securing collar 116 is longitudinally slidable along the housing 104 and/or latch housing 106 in a direction that is generally parallel to a longitudinal axis of the connector 100. The latch housing 106 (e.g., outer collar 110) and the securing collar 116 include corresponding rotational alignment keys (e.g., corresponding projections and recesses) that engage one another to prevent the latch housing and securing collar from rotating relative to one another.

Referring to FIGS. 2 and 4-8 the securing features of the connector 100 to inhibit unintentional withdrawal of the connector from the multiport device 12 will now be described. The connector 100 includes at least one latch assembly 118 that secures to the connector to one of the ports 18 of the multiport device 12. In the illustrated embodiment, the connector 100 includes three latch assemblies 118 circumferentially spaced around the connector. More or fewer latch assemblies are within the scope of the present disclosure. The latch assemblies 118 are generally identical, so one latch assembly will now be described with the understanding the description applies to all the latch assemblies.

Figure 8:
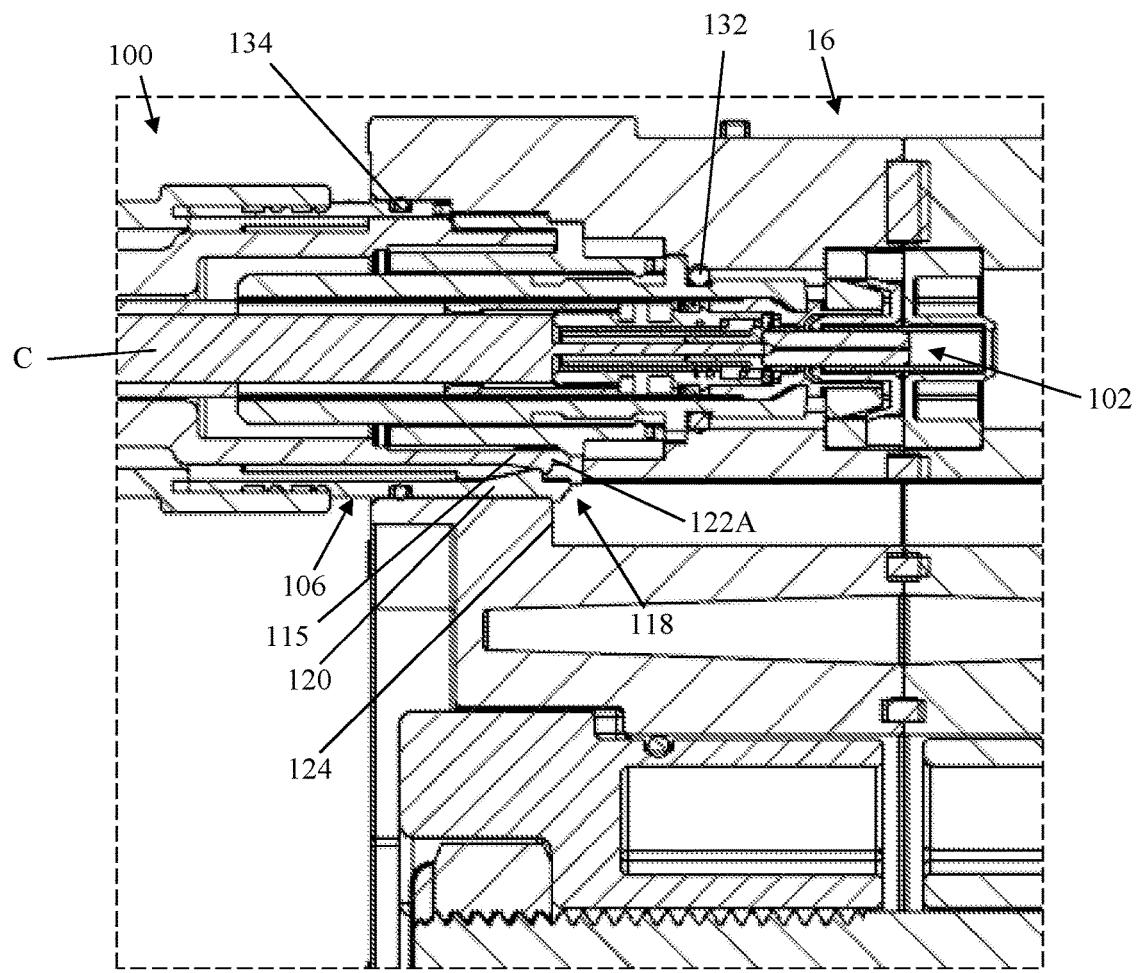
FIG. 8 is an enlarged, fragmentary section of the multiport assembly.

The latch assembly 118 includes a deflectable latch 120 and a brace 122. The deflectable latch 120 is resiliently deflectable. The deflectable latch 120 is supported by the housing 104. Specifically, the deflectable latch 120 is part of the latch housing 106. The deflectable latch 120 is coupled to the outer collar 110. The deflectable latch 120 is arranged to be disposed in the connector socket 20 when the connector 100 is disposed in the port 18 (FIG. 8). Likewise, the brace 122 is arranged to be disposed in the connector socket 20 when the connector 100 is in the port 18. The deflectable latch 120 is configured for latching engagement with the multiport device 12, specifically the port 18, to releasably retain the connector 100 in the port. The port 18 includes a shoulder 124 (broadly, latch retainer) which the deflectable latch 120 engages to secure the connector 100 in the port. The deflectable latch 120 is yieldably biased in a latching position (FIG. 8). The deflectable latch 120 is moveable or deflectable, relative to the rest of the latch housing 106, between the latching position and an unlatching position (not shown). In the unlatching position, the deflectable latch 120 is clear of the latch retainer 124, thereby permitting the latch to move longitudinally past the latch retainer as the connector 100 is moved in the insertion direction or in an opposite removal direction. In other words, the deflectable latch 120 does not inhibit the connector 100 from being disconnected from the port 18 when in the unlatching position. In the illustrated embodiment, the deflectable latch 120 comprises a resiliently deflectable arm with one end connected to the outer collar 110 and an opposite free end having a detent 121 thereon. The connection between the arm and the outer collar 110 forms a living hinge about which the latch 120 can deflect (e.g., pivot). The detent engages the latch retainer 124 (FIG. 8) to secure the connector 100 in the port 18.

Figure 7:
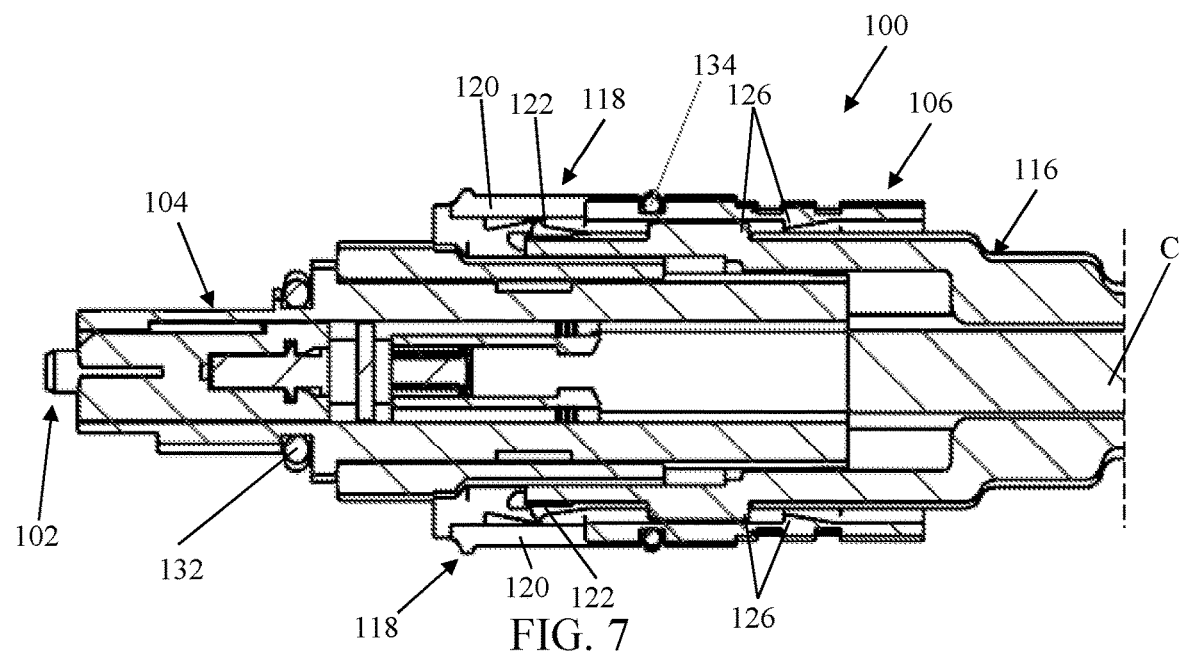
FIG. 7 is a horizontal section of the connector, with the securing collar in a non-bracing position.

The brace 122 of the latch assembly 118 is configured to selectively brace the deflectable latch 120 and to selectively permit the deflectable latch to deflect. The brace 120 is supported by the housing 104. Specifically, the brace 120 is part of the securing collar 116. The brace 120 is disposed between the housing 104 and the deflectable latch 120. The brace 120 is movable relative to the deflectable latch 120 (broadly, the latch housing 106). Specifically, the brace 122 is longitudinally slidable along the deflectable latch 120. The brace 122 is movable between a bracing position (FIGS. 4 and 8) and a non-bracing position (FIG. 7). In the bracing position, the brace 122 inhibits the deflectable latch 120 from being deflected (i.e., moving toward the unlatching position). Specifically, the brace 122 is arranged to underlie the deflectable latch 120 to prevent the deflectable latch from deflecting radially inward. In the non-bracing position, the brace does not inhibit the deflectable latch 120 from being deflected (e.g., deflected radially inward). Specifically, the brace 122 is generally disposed rearward of the deflectable latch 120 such that it generally does not underlie the deflectable latch, thus permitting the deflectable latch to be deflected radially inward. Moving the securing collar 116 moves the brace 122 between the bracing and non-bracing positions.

In the illustrated embodiment, the radially inner side of the deflectable latch 120 includes a latch ramp 120A and the radially outer side of the brace 122 includes a brace ramp 122A. The latch and brace ramps engage and slide along one another as the brace 122 is moved between the bracing and non-bracing positions. In the bracing position, the tip of the brace ramp is disposed distal of the tip of the latch ramp. This arrangement holds the brace 120 in the bracing position. In addition, in the bracing position, a rear ramped surface of the brace ramp engages the tip of the latch ramp to brace the deflectable latch 120. As is apparent, the latch and brace ramps generally deflect the deflectable latch 120 radially outward as the brace 122 moves between the bracing and non-bracing positions. The front end of the brace 122 may also include a chamfered edge that engages a corresponding chamfered portion of the latch housing 106 to position the brace in the bracing position.

Referring to FIG. 7, the securing collar 116 and the latch housing 106 may include corresponding stops 126 (broadly, stop surfaces) that engage each other to limit the rearward movement of the securing collar relative to the latch housing. In other words, the stops 126 limit the rearward movement of the brace 122 relative to the deflectable latch 120. When the stops 126 are engaged, the brace 122 is generally in the non-bracing position.

Figure 4:
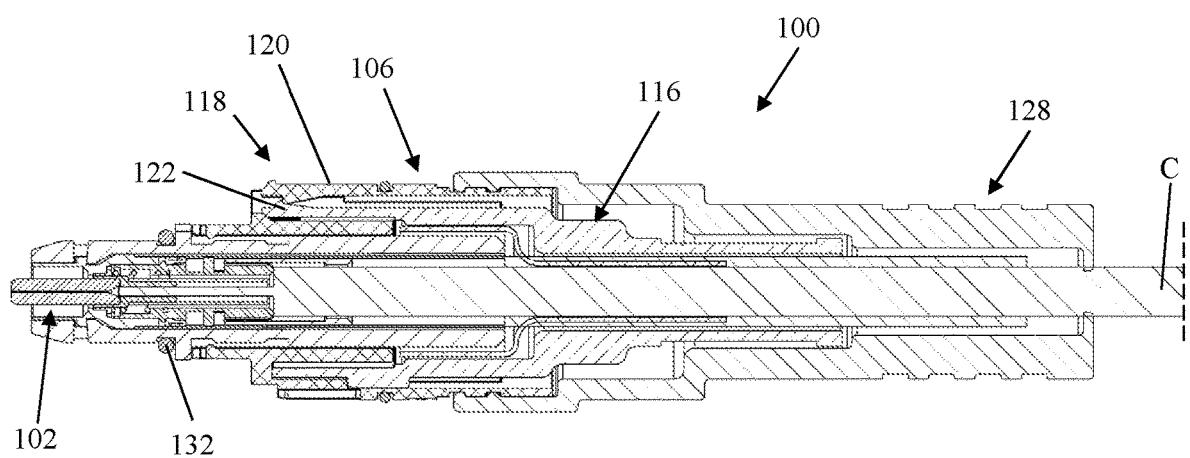
FIG. 4 is a vertical section of the connector, with a securing collar in a bracing position.
Figure 5:
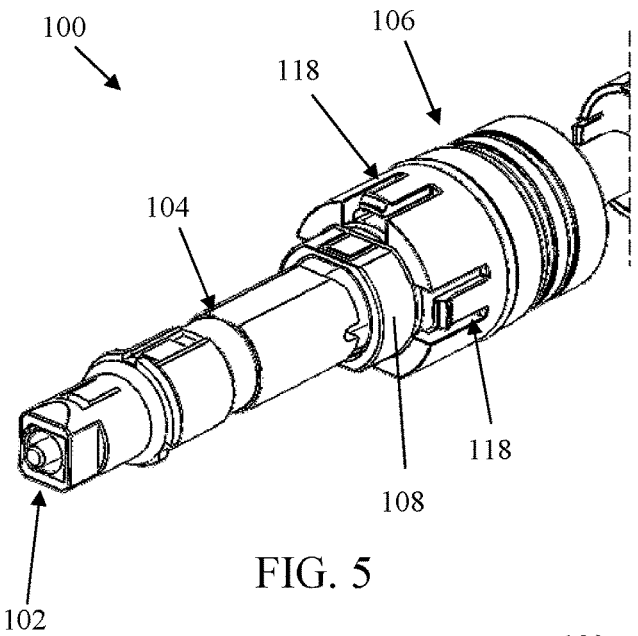
FIG. 5 is an enlarged perspective of the connector with parts removed.

The connector 100 also includes a shroud 128. The shroud 128 is releasably coupled to the latch housing 106. The shroud 128 defines a longitudinal bore therethrough in which a portion of the latch housing 106, a portion of the housing 104, a portion of the securing collar 116, and a portion of the cable C are disposed. As shown in FIG. 4, the latch housing 106 and the shroud 128 inhibit a user from accessing the securing collar 116 when the shroud is coupled to the latch housing. The latch housing 106 and the shroud 128 surround the securing collar 116. In the illustrated embodiment, the shroud 128 includes one or more inner ribs that mate with (e.g., are disposed in) one or more corresponding circumferential recesses or channels of the latch housing 106 (e.g., the outer collar 110) to couple the shroud to the latch housing. The shroud 128 is preferably made of an elastomeric material to enable a user to coupled and decouple the shroud from the latch housing 106.

Referring to FIGS. 9 and 10, the connector 100, specifically the latch housing 106, and the port 18 may include rotation alignment keys 130 (e.g., corresponding projections and recesses) that engage one another to orient the connector relative to the port and prevent the connector from rotating in the port. The connector 100 may also include first seal 132 (e.g., an O-ring) that engages the port 18 to form fluid-tight seal with the multiport device to prevent the ingress of moisture and debris. The seal 132 is disposed on the latch housing 106. A second seal 134 on the latch collar 106 is positioned to engage and seal with a larger portion or the port 18 when the latch collar is received in the port. The first and second seals 132, 134 operate to protect the fiber optics of the connector 100 from being contaminated with moisture or debris. It will be understood that this protection would also be beneficial for any electrical connections made by a connector including optical and electrical components.

The operation of connecting and disconnecting the connector 100 with a port 18 of the multiport device 12 will now to described. Before connecting the connector 100 with the port, the shroud 128 is disconnected from the latch housing 106 to access the securing collar 116. This allows the user to move the securing collar 116 (e.g., the braces 122 thereof) to the non-bracing position. Thereafter, the connector 100 is aligned with the desired port 18 and then the front end of the connector is inserted into the port (e.g., the connector socket). If needed, the connector 100 may be rotated to align the rotational alignment keys 130 of the connector and the port 18. As the projecting housing 104 enters a narrower portion of the port 18, the first seal 132 on the housing engages and seals with the multi-port device within the port. As the connector 100 is inserted, an interior surface of the port 18 engages and deflects the deflectable latches 120. When the deflectable latches 120 pass the one or more latch retainers 124, the deflectable latches resiliently rebound and return to the latching position, thereby positioning the latches to engage the latch retainers to secure the connector 100 in the port 18. This latches the connector 100 to the port 18 to inhibit inadvertent pullout. After the latches 120 return to the latching position, the securing collar 116 (e.g., the braces 122 thereof) is moved forward by the user into the bracing position, thereby securing the deflectable latches 120 in the latching position. The user applies a sufficient amount of force to the securing collar 116 to deflect the deflectable latches 120 radially outward to move the brace ramps pass the latch ramps. The deformation of the latch 120 and/or the braces 122 applies a biasing force tending to hold the connection of the latch to the port 18. At this point, the second seal 134 also sealingly engages the multiport device within the port 18. The user then reattaches the shroud 128 to the latch housing 106. When two connectors 100 are connected to corresponding ports 18 of the multiport device 12, the ferrule assemblies 102 meet to form a communication connection (e.g., optical connection) therebetween (not shown).

To withdraw or remove the connector 100 from the port 18, the user first removes the shroud from the latch housing 106. The user then moves the securing collar 116 rearward to the non-bracing position. The user applies a sufficient amount of force to the securing collar 116 to deflect the unbraced deflectable latches 120 radially outward to move the brace ramps pass the latch ramps. After, the user then moves the rest of the connector 100 out of the port 18. The user applies a sufficient amount of force to the connector 100 to deflect the unbraced deflectable latches 120 radially inward to move the latches out of alignment with the latch retainers 124. The user can then remove the rest of connector 100 from the port 18.

Referring to FIGS. 11-16, another embodiment of a connector according to the present disclosure is generally indicated at reference numeral 200. The connector 200 is usable with a multiport device 12', which is generally the same as multiport device 12 except for the differences indicated and described herein. Generally, the differences in multiport device 12' pertain to the different securing features of the connector 200 discussed below.

The connector 200 plugs into one of the ports 18 of the multiport device 12'. The connector 200 includes a ferrule assembly 202 (containing one or more ferrules). The ferrule assembly 202 defines a connection end of the connector 200. The ferrule assembly 202 is received first into one of the ports 18 of the multiport device 12' to plug or connect the connector to the port. In this embodiment, the ferrule assembly 202 comprises a duplex connector and specifically a duplex SN ferrule assembly. Thus, in this embodiment, the connector 200 may be referred to as a SN connector (e.g., SN optical connector). In this embodiment, the connector 200 is attached to an end of a fiber optic cable (not shown). In other embodiments, the ferrule assembly may comprise other types of ferrules assemblies, such as an MPO ferrule assembly or an SC ferrule assembly. Any ferrule configuration is within the scope of the present disclosure.

The connector 200 includes a housing 204 (e.g., a ferrule housing) that supports the ferrule assembly 202. The housing 204 extends from a front or distal end portion to a rear or proximal end portion. The cable C extends rearward or proximally from the rear end portion and the ferrule assembly 202 extend forward or distally from the front end portion of the housing 204. The housing 204 includes a backing or flange that braces a first seal 232 (e.g., an O-ring) (FIG. 15) that engages a narrower portion of the port 18 to form a fluid-tight seal with the multiport device to prevent the ingress of moisture and debris.

The connector 200 includes a deflector collar or housing 206 (e.g., locking collar) supported by the housing 204. The latch housing 206 is movable relative to the housing 204. Specifically, the deflector housing 206 is longitudinally slidable along the housing 204 in a direction that is generally parallel to a longitudinal axis of the connector 200. The deflector housing 206 is generally cylindrical and defines a housing space or bore sized and shaped to receive the housing 204. The housing 204 and the deflector housing 206 can include corresponding rotational alignment keys 207 (e.g., corresponding projections and recesses) to prevent the housing and deflector housing from rotating relative to one another. In the illustrated embodiment, the rotational alignment keys 207 also act as stops to limit the movement of the deflector housing 206 in the forward direction relative to the housing 204.

Referring to FIGS. 11-15, the securing features of the connector 200 to inhibit unintentional withdrawal of the connector from the multiport device 12' will now be described. The connector 200 includes at least one latch assembly 218 that secures to the connector to one of the ports 18 of the multiport device 12'. In the illustrated embodiment, the connector 200 includes two latch assemblies 218 on opposite sides of the connector. More or fewer latch assemblies are within the scope of the present disclosure. The latch assemblies 218 are generally identical, so one latch assembly will now be described with the understanding the description applies to all the latch assemblies.

Figure 15:
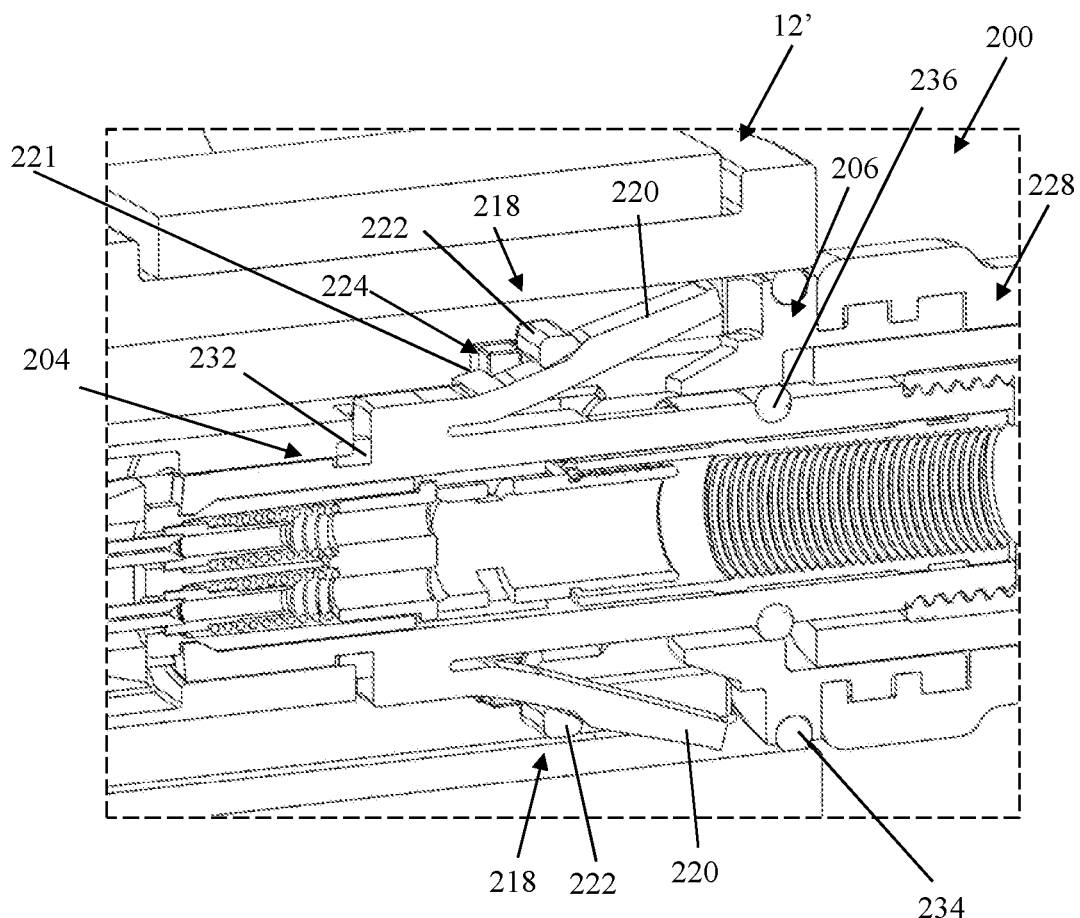
FIG. 15 is a fragmentary perspective of a multiport assembly in vertical section according to another embodiment of the present disclosure, the multiport assembly including the connector of FIG. 11.

The latch assembly 218 includes a deflectable latch 220 and a deflector 222. The deflectable latch 220 is resiliently deflectable. The deflectable latch 220 is supported by the housing 204. Specifically, the deflectable latch 220 is mounted on the housing 204. The deflectable latch 220 is arranged to be disposed in the connector socket 20 when the connector 200 is disposed in the port 18 (FIG. 15). Likewise, the deflector 222 is arranged to be disposed in the connector socket 20 when the connector 200 is in the port 18. The deflectable latch 220 is configured for latching engagement with the multiport device 12', specifically the port 18, to releasably retain the connector 200 in the port. The port 18 includes one or more latch retainers 224 (broadly, engagement surfaces) which the deflectable latch engages to secure the connector 200 in the port. As shown in FIG. 15, in this embodiment, the latch retainer 224 comprises a notch extending outward from the port 18. The deflectable latch 218 is yieldably biased in a latching position (FIG. 15). The deflectable latch 218 is moveable or deflectable, relative to the housing 204, between the latching position and an unlatching position (not shown). In the unlatching position, the deflectable latch 218 is clear of the latch retainer 224, thereby permitting the latch to move longitudinally pass the latch retainer as the connector 200 is moved in the insertion direction or in an opposite removal direction. In other words, the deflectable latch 220 does not inhibit the connector 200 from being disconnected from the port 18 when in the unlatching position. In the illustrated embodiment, the deflectable latch 220 includes a resiliently deflectable arm or wing with one end connected to the housing and an opposite free end. The connection between the arm and the housing 204 forms a living hinge about which the latch 220 can deflect (e.g., pivot). The latch 220 includes one or more detents or catches 221. The detents 221 are arranged for latching engagement with the multiport device 12' to releasably retain the connector 200 in the port 18. In the illustrated embodiment, the latch 220 includes two detents 221 extending laterally outward from opposite sides of the arm. The detents 221 are adjacent but spaced slightly apart from the end of the arm attached to the housing 204. The arm has a first portion connected to the housing that extends generally rearward, parallel to the longitudinal axis, and a second portion extending from the first portion to the free end. The second portion extends at an angle to the longitudinal axis—generally radially outward as the second portion extends rearward from the first portion. Each detent 221 engages one of the notches 224 (FIG. 15) to secure the connector 200 in the port 200.

The deflector 222 of the latch assembly 218 is configured to selectively move the deflectable latch 220 from the latching position to the unlatching position. The deflector 222 is supported by the housing 204. The deflector 222 is movable relative to the deflectable latch 220 (broadly, the housing 204) between a deflecting position (not shown) and a non-deflecting position (FIG. 15). The deflector 222 moves along the longitudinal axis of the connector 200 between the deflecting and non-deflecting positions. When the deflector 222 is in the deflecting position, the deflectable latch 220 is in the unlatching position. When the deflector 222 is in the non-deflecting position, the deflectable latch 220 is in the latching position. As the deflector 222 is moved rearward, from the non-deflecting position to the deflecting position, the deflector engages and pushes the deflectable latch 220 radially inward to move the latch from the latching position to the unlatching position. This moves the detents 221 outs of alignment with the latch retainers 224 (e.g., moves the detents radially inward of the notches), thereby permitting the detents to move pass the latch retainers. As the deflector 222 is moved forward, from the deflecting position to the non-deflecting position, the deflector 222 permits the deflectable latch 220 to resiliently return to the latching position. In one embodiment, the deflectable latch 220 includes a ramp or projection arranged to be engaged by the deflector 222 as the deflector moves toward the deflecting position to position the latch in the unlatching position.

The deflector 222 defines an opening. The deflectable latch 220 is disposed in the opening. Specifically, the arm of the deflectable latch extends through the opening. The deflector 222 is part of the deflector housing 206. In one embodiment, the deflectable latch 220 includes a stop (not shown) at the free end portion of the arm arranged to engage the deflector 222 and inhibit further rearward movement of the deflector (and thereby the deflector housing 206) relative to the deflectable latch. The stop thereby limits the rearward movement of the deflector housing 206 relative to the housing 204. In one embodiment, the latch assembly may include a brace that is part of the deflector housing and is similar to the brace 122 described above. Thus, it is understood the connector 200 may include the brace 122 of connector 100.

Figure 13:
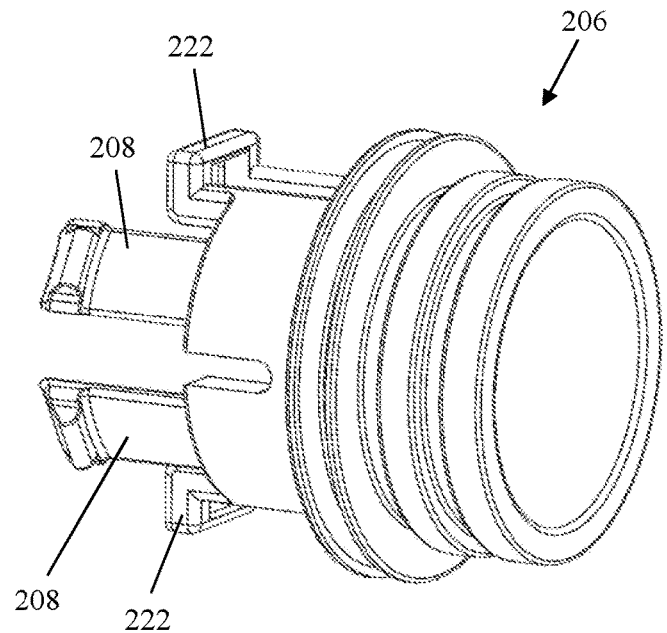
FIG. 13 is a perspective of a deflector housing of the connector of FIG. 11.
Figure 14:
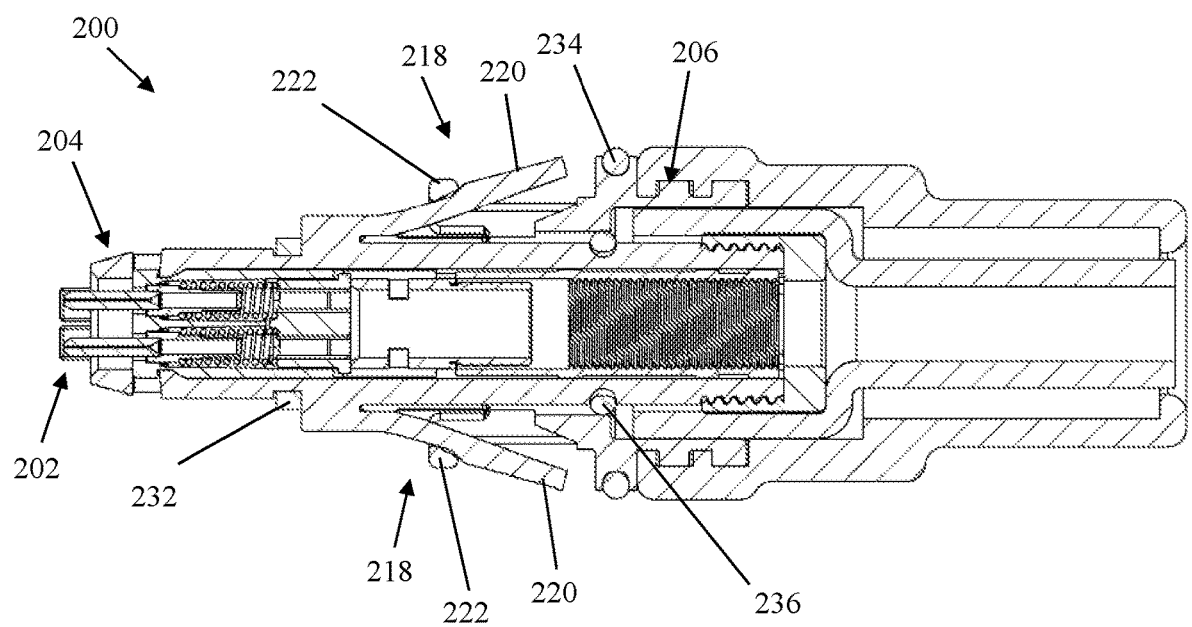
FIG. 14 is a vertical section of the connector of FIG. 11.
Figure 16:
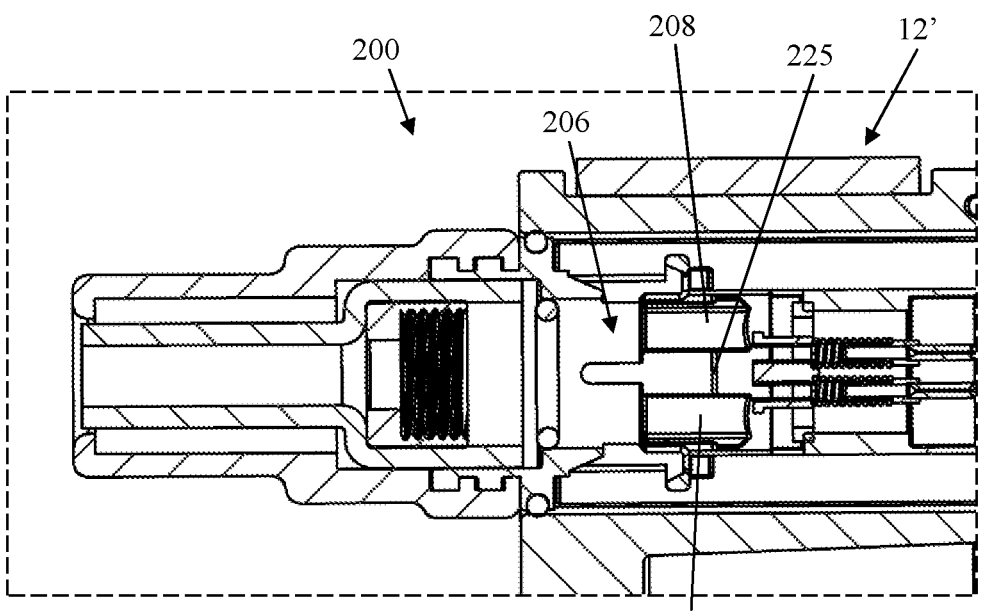
FIG. 16 is a vertical section of the multiport assembly of FIG. 15, which portions of the connector removed to reveal interior details.

Referring to FIGS. 13 and 16, the deflector housing 206 may include one or more securing latches 208. The securing latches 208 are configured for latching engagement with the port 18 of the multiport device 12' to inhibit the deflector housing 206 (and thereby the deflector 222) from inadvertently moving relative to the housing 204 (and thereby the latch 220) when the connector 200 is in the port. The securing latches 208 are resiliently deflectable. The securing latches 208 include an arm and a detent at a free end thereof. Each securing latch 208 engages a securing latch retainer 225 (broadly, a securing latch retainer surface) of the port 18 (FIG. 16). In the illustrated embodiment, the securing latch retainers 225 comprises a lip or shoulder of the port 18. Like the latch retainers 224, the securing latch retainers 225 are also disposed in (e.g., border) the connector socket 20. The connector 200 may also include a second seal 234 (e.g., an O-ring) that engages a larger portion of the port 18 to form fluid-tight seal with the multiport device to prevent the ingress of moisture and debris. The seal 234 is disposed on the deflector housing 206. A third seal 236 on the housing 204 engages and seals with an interior surface of the deflector housing 206. The deflector housing is able to slide relative to the housing 204, while the third seal 236 maintains sealing engagement.

The connector 200 also includes a shroud 228. The shroud 228 is coupled to the deflector housing 206. The shroud 228 defines a longitudinal bore therethrough in which a portion of the deflector housing 206, a portion of the housing 204, and a portion of the cable are disposed. The shroud 228 moves with the deflector housing 206 as the deflector housing moves between the deflecting and non-deflecting positions.

The port 18 may include one or more rotational alignment keys that are arranged to engage specific portions of the connector 200, such as the deflectable latches 220 or other rotational alignment keys, to orient the connector relative to the port and prevent the connector from rotating in the port.

The operation of connecting and disconnection the connector 200 with a port 18 of the multiport device 12' will now to described. To connect the connector 200 with the multiport device 12', the connector is aligned with the desired port 18 and then the front end of the connector is inserted into the port (e.g., the connector socket). If needed, the connector 200 may be rotated to align the rotational alignment keys of the port 18 with the connector. As the connector 200 is inserted, the port 18 engages and deflects the deflectable latches 220 and the securing latches 208. For example, an interior surface of the port 18 may deflect the securing latches to their unlatching position and the latch retainers 224 may deflect the deflectable latches 220 to their unlatching position. In one embodiment, one or both of the deflectable latches 220 (e.g., the detents 221) and the latch retainers 224 may have ramped surfaces to facilitate the movement of the latches toward the unlatching position as the connector 200 is inserted into the port 18. When the securing latches 208 pass the securing latch retainers 225, the securing latches resiliently rebound and return to their latching position, thereby positioning the securing latches to engage the securing latch retainers 225 to inhibit the deflector housing 206 from inadvertently moving rearward. Thus, the securing latches 208 inhibit the deflectors 222 from unintentionally moving the deflectable latches 220 to their unlatching position. Similarly, when the deflectable latches 220 pass the one or more latch retainers 224, the deflectable latches resiliently rebound and return to the latching position, thereby positing the latches to engage the latch retainers to secure the connector 200 in the port 18. This latches the connector 200 to the port 18 to inhibit inadvertent pullout. When two connectors 200 are connected to corresponding ports 18 of the multiport device 12', the ferrule assemblies 202 meet to form a communication connection (e.g., optical connection) therebetween (not shown).

To withdraw or remove the connector 200 from the port 18, the user first pulls back on the deflector housing 206 to move the deflector housing and deflectors 222 from the non-deflecting position to the deflecting position. The user applies a sufficient amount of force to move the deflector housing 206 such that the securing latches 208 are moved to their unlatching position, thereby permitting the deflector housing to move relative to the port 18. As the deflector housing 206 moves rearward, the deflectors 222 move from the non-deflecting position to the deflecting position. As described above, this moves the deflectable latches from their latching position to their unlatching position, thereby moving the detents 221 out of alignment with the latch retainers 224. After the movement of the deflector housing 206, the user moves the rest of the connector 200 out of the port 18.

Figure 17:
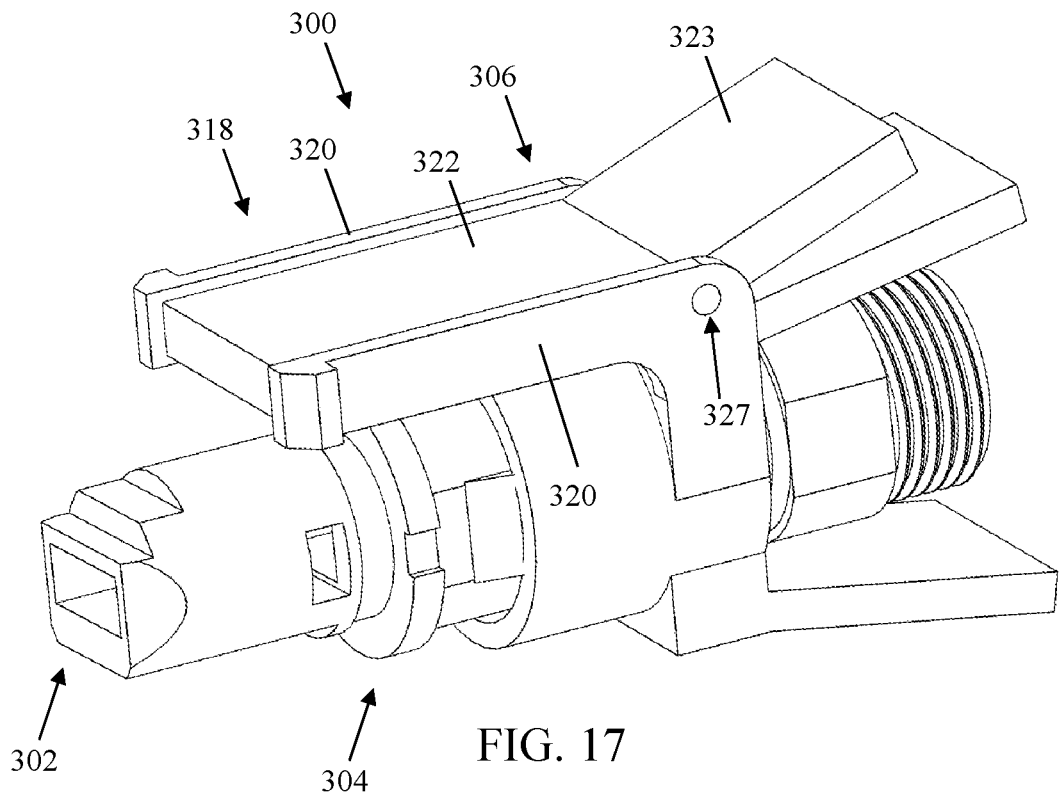
FIG. 17 is a perspective of a connector according to another embodiment of the present disclosure.
Figure 18:
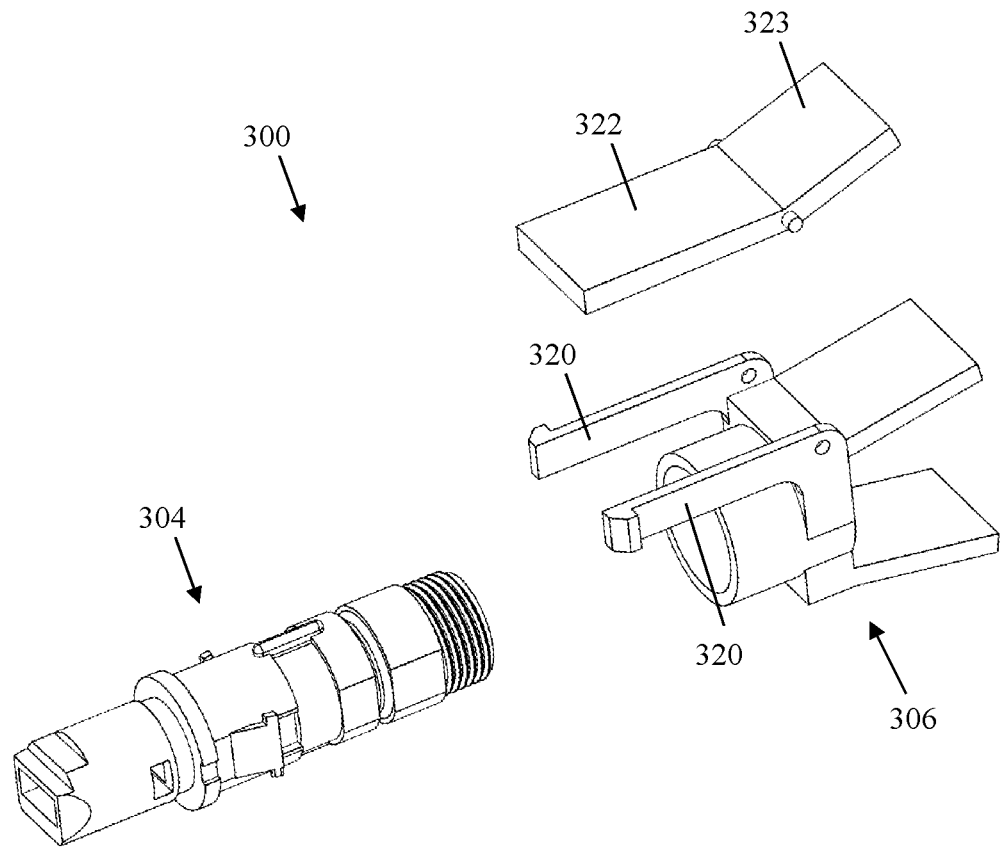
FIG. 18 is an exploded view of the connector of FIG. 17.
Figure 19:
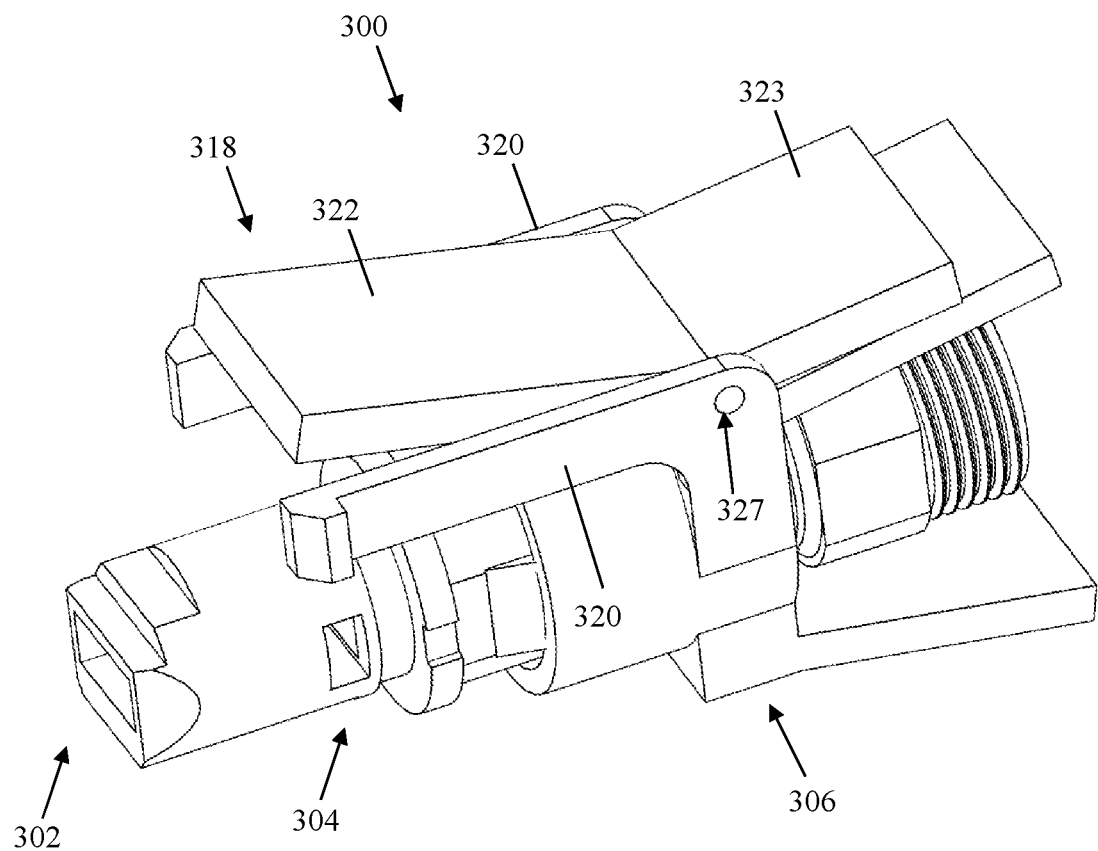
FIG. 19 is a perspective of the connector of FIG. 17, which a brace in a non-bracing position.

Referring to FIGS. 17-19, another embodiment of a connector according to the present disclosure is generally indicated at 300. The connector 200 is usable with a multiport device, such as one that is generally the same as multiport device 12 expect for the differences indicated and described herein. Generally, the differences in the multiport device that receives the connector 300 pertain to the different securing features of the connector 300 discussed below.

The connector 300 plugs into one of the ports 18 of the multiport device. The connector 300 includes a ferrule assembly 302 (containing one or more ferrules). The ferrule assembly 302 defines a connection end of the connector 300. The ferrule assembly 302 is received first into one of the ports 18 of the multiport device to plug or connect the connector to the port. In this embodiment, the ferrule assembly 302 comprises a MPO ferrule assembly. Thus, in this embodiment, the connector 300 may be referred to as a MPO connector (e.g., MPO optical connector). In this embodiment, the connector 100 is attached to an end of a fiber optic cable (not shown). In other embodiments, the ferrule assembly may comprise other types of ferrules assemblies, such as an SC ferrule assembly or an SN ferrule assembly. Any ferrule configuration is within the scope of the present disclosure.

The connector 300 includes a housing 304 (e.g., a ferrule housing) that supports the ferrule assembly 302. The housing 304 extends from a front or distal end portion to a rear or proximal end portion. The cable extends rearward or proximally from the rear end portion and the ferrule assembly 302 extend forward or distally from the front end portion of the housing 304. The housing 304 includes a flange that braces a seal (e.g., an O-ring) that engages the port 18 to form a fluid-tight seal with the multiport device to prevent the ingress of moisture and debris. The connector 300 includes a latch collar or housing 306 supported by the housing 304. Preferably, the latch housing 306 is fixed to the housing 304.

The securing features of the connector 300 to inhibit unintentional withdrawal of the connector from the multiport device will now be described. The connector 300 includes at least one latch assembly 318 that secures the connector to one of the ports 18 of the multiport device. In the illustrated embodiment, the connector 300 includes one latch assembly 318, although additional latch assemblies are within the scope of the present disclosure.

The latch assembly 318 includes at least one deflectable latch 320 and a brace 322. In the illustrated embodiment, the latch assembly 318 includes two deflectable latches 320. Each deflectable latch 320 is resiliently deflectable. Each deflectable latch 320 is supported by the housing 304. Each deflectable latch 320 is part of the latch housing 306. The deflectable latches 320 are arranged to be disposed in the connector socket when the connector 300 is disposed in the port. Likewise, the brace 322 is arranged to be disposed in the connector socket 20 when the connector 300 is in the port 18. The deflectable latches 320 are configured for latching engagement with the multiport device, specifically the port 18, to releasably retain the connector 300 in the port. Specially, the port 18 includes latch retainers (not shown) (broadly, engagement surface), such as notches, lips or shoulders, which the deflectable latches engage to secure the connector 300 in the port. The deflectable latches 320 are yieldably biased in a latching position (FIGS. 17 and 19). The deflectable latches 320 are moveable or deflectable, relative to the rest of the latch housing 306, between the latching position and an unlatching position (not shown). In the unlatching position, the deflectable latches 320 are clear of the latch retainers, thereby permitting the latches to move longitudinally pass the latch retainers as the connector 300 is moved in the insertion direction or in an opposite removal direction. In other words, the deflectable latches 320 do not inhibit the connector 300 from being disconnected from the port when in the unlatching position. In the illustrated embodiment, each deflectable latch 320 includes a resiliently deflectable arm with one end connected to another portion of the latch housing 306 and an opposite free end having a detent thereon. The connection between the arm and the portion of the latch housing 306 forms a living hinge about which the latch 320 can deflect (e.g., pivot). The detent engages the latch retainer to secure the connector 300 in the port 18.

The brace 322 of the latch assembly 318 is configured to selectively brace the deflectable latches 320 to selectively permit the deflectable latches to deflect. The brace 320 is supported by the housing 304. Specifically, the brace 120 is coupled to the latch housing 306. The brace 120 is movable, specifically pivotable or rotatable, relative to the deflectable latches 320 (broadly, the latch housing 306). A hinge connection 327 connects the brace 322 to the latch housing 306. The brace 322 is movable (specifically, pivotable) between a bracing position (FIG. 17) and a non-bracing position (FIG. 19). In the bracing position, the brace 322 inhibits the deflectable latches 320 from being deflected. Specifically, the brace 322 is arranged to be disposed on a lateral side of each deflectable latch 320. The prevents the deflectable latches 320 from deflecting laterally, toward one another. In the illustrated embodiment, the brace 322 is disposed between the two deflectable latches 320 when in the bracing position. One side of brace 322 inhibits lateral deflection of one of the deflectable latches 320 and the other side of the brace inhibits lateral deflection of the other deflectable latch. In the non-bracing position, the brace 322 does not inhibit the deflectable latches 320 from being deflected (e.g., deflected laterally). The brace 322 is out of lateral alignment with the deflectable latches 320. Specifically, the brace 322 is generally disposed above of the deflectable latches 320 such that it does not laterally brace the deflectable latches, thus permitting the deflectable latches to be deflected toward one another. The brace 322 is connected to a finger tab 323 (broadly, an actuator). The finger tab 323 is arranged to be engaged by the user to pivot the brace toward the non-bracing position. The finger tab 323 is positioned such that is it disposed outside of the connector socket 20 when the connector 300 is in the port to permit the user access to it. The connector 300 may include a biasing member (not shown), such as spring, to bias the brace 322 toward the bracing position.

The port may include one or more rotational alignment keys that are arranged to engage specific portions of the connector 300, such as the deflectable latches 320 or other rotational alignment keys, to orient the connector relative to the port and prevent the connector from rotating in the port.

The operation of connecting and disconnecting the connector 300 with a port of the multiport device will now be described. The connector 300 is aligned with the desired port and then the front end of the connector is inserted into the port (e.g., the connector socket). If needed, the connector 300 may be rotated to align the rotational alignment keys the port with the corresponding portions of the connector. As the connector 300 is being inserted, the user engages the thumb tab 323 to move the brace 322 to the non-bracing position. This allows the deflectable latches 320 to be engaged and deflected by the port, such as an interior surface thereof. When the deflectable latches 320 pass the latch retainers, the deflectable latches resiliently rebound and return to the latching position, thereby positioning the latches to engage the latch retainers to secure the connector 300 in the port. This latches the connector 300 to the port to inhibit inadvertent pullout. After the latches 320 return to the latching position, the user releases the thumb tab 323 to permit the brace 322 to move to the bracing position, thereby securing the deflectable latches 320 in the latching position. When two connectors 300 are connected to corresponding ports of the multiport device, the ferrule assemblies 302 meet to form a communication connection (e.g., optical connection) therebetween (not shown).

To withdraw or remove the connector 300 from the port, the user engages (e.g., squeezes) the thumb tab 323 to move the brace 322 to the non-bracing position. After, the user applies a sufficient amount of force to the connector 300 to deflect the deflectable latches 320 laterally toward one another to move the latches out of alignment with the latch retainers. The user then moves the connector 300 out of the port.

Modifications and variations of the disclosed embodiments are possible without departing from the scope of the invention defined in the appended claims. For example, where specific dimensions are given, it will be understood that they are exemplary only and other dimensions are possible.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An outdoor rated fiber optic connector for being plugged into a port of a multi-port device, the port defining a connector socket sized and shaped to receive the connector, the connector comprising:
   a housing having a longitudinal axis and an exterior surface;
   a first seal on the housing positioned for engaging the multi-port device in the port upon reception of the connector in the port;
   a ferrule assembly supported by the housing and defining a connection end of the connector;
   a deflectable latch supported by the housing and arranged to be disposed in the connector socket when the connector is disposed in the port, the deflectable latch configured for latching engagement with the port device to releasably retain the connector in the port; and
   a deflector supported by the housing and movable relative to the latch between a deflecting position and a non-deflecting position, wherein in the deflecting position the deflectable latch is in an unlatching position and wherein in the non-deflecting position the latch is not in the unlatching position, the deflectable latch not inhibiting the outdoor rated fiber optic connector from being disconnected from the port when in the unlatching position.

2. The outdoor rated fiber optic connector of claim 1, further comprising a locking collar supported on the housing for movement with respect to the housing along the longitudinal axis, and a second seal carried by the locking collar and disposed for engaging the multi-port device in the port upon reception of the connector in the port.

3. The outdoor rated fiber optic connector of claim 2, further comprising a third seal between the locking collar and the housing.

4. The outdoor rated fiber optic connector of claim 1, wherein the housing defines a longitudinal axis of the outdoor rated fiber optic connector, the deflector movable along the longitudinal axis between the deflecting and non-deflecting positions.

5. The outdoor rated fiber optic connector of claim 1, further comprising a deflector housing supported by and movable relative to the housing, the deflector housing including the deflector.

6. The outdoor rated fiber optic connector of claim 5, wherein the deflector housing defining an opening, the deflectable latch disposed in the opening.

7. The outdoor rated fiber optic connector of claim 5, wherein the deflector housing includes a securing latch configured for latching engagement with the port device to inhibit the deflector housing from moving relative to the housing when the outdoor rated fiber optic connector is in the port.

8. The outdoor rated fiber optic connector of claim 5, further comprising a shroud coupled to and movable with the deflector housing, the shroud arranged to cover a portion of a fiber optic cable when the fiber optic cable is attached to the outdoor rated fiber optic connector.

9. The outdoor rated fiber optic connector of claim 1, wherein the deflectable latch includes a first detent and a second detent, the first and second detents each arranged for latching engagement with the port device to releasably retain the outdoor rated fiber optic connector in the port.

10. The outdoor rated fiber optic connector of claim 1, further comprising
a latch housing supported by and movable relative to the housing, the latch housing including a housing stop arranged to engage the housing to limit the movement of the latch housing relative to the housing.

11. An outdoor rated fiber optic connector for being plugged into a port of a multi-port device, the port defining a connector socket sized and shaped to receive the connector, the connector comprising:
 a housing having a longitudinal axis and an exterior surface;
 a first seal on the housing positioned for engaging the multi-port device in the port upon reception of the connector in the port;
 a ferrule assembly supported by the housing and defining a connection end of the connector;
 a deflectable latch supported by the housing and arranged to be disposed in the connector socket when the connector is disposed in the port, the deflectable latch configured for latching engagement with the port device to releasably retain the connector in the port; and
 a brace supported by the housing and movable relative to the deflectable latch between a bracing position and a non-bracing position, wherein in the bracing position the brace inhibits the deflectable latch from being deflected and wherein in the non-bracing position the brace does not inhibit the deflectable latch from being deflected.

12. The outdoor rated fiber optic connector of claim 11, wherein the brace is disposed between the housing and the deflectable latch.

13. The outdoor rated fiber optic connector of claim 11, further comprising
 a securing collar supported by and movable relative to the housing, the securing collar including the brace.

14. The outdoor rated fiber optic connector of claim 13, further comprising
 a latch housing supported by the housing, the latch housing including the deflectable latch, the securing collar being movable relative to the latch housing.

15. The outdoor rated fiber optic connector of claim 14, wherein the latch housing is movable relative to the housing.

16. The outdoor rated fiber optic connector of claim 13, further comprising
 a latch housing and a shroud releasably coupled to the latch housing, the latch housing and the shroud inhibiting user access to the securing collar when the shroud is coupled to the latch housing.

17. The outdoor rated fiber optic connector of claim 11, wherein the brace is disposed on a lateral side of the deflectable latch.

18. The outdoor rated fiber optic connector of claim 17, wherein the deflectable latch is a first deflectable latch, the outdoor rated fiber optic connector further comprising a second deflectable latch supported by the housing and arranged to be disposed in the connector socket when the outdoor rated fiber optic connector is disposed in the port, the second deflectable latch configured for latching engagement with the port device to releasably retain the outdoor rated fiber optic connector in the port, the brace disposed between the first and second deflectable latches when the brace is in the bracing position.

19. The outdoor rated fiber optic connector of claim 18, wherein the brace pivots between the bracing position and the non-bracing position.

* * * * *